No. 737,392. Patented August 25, 1903.

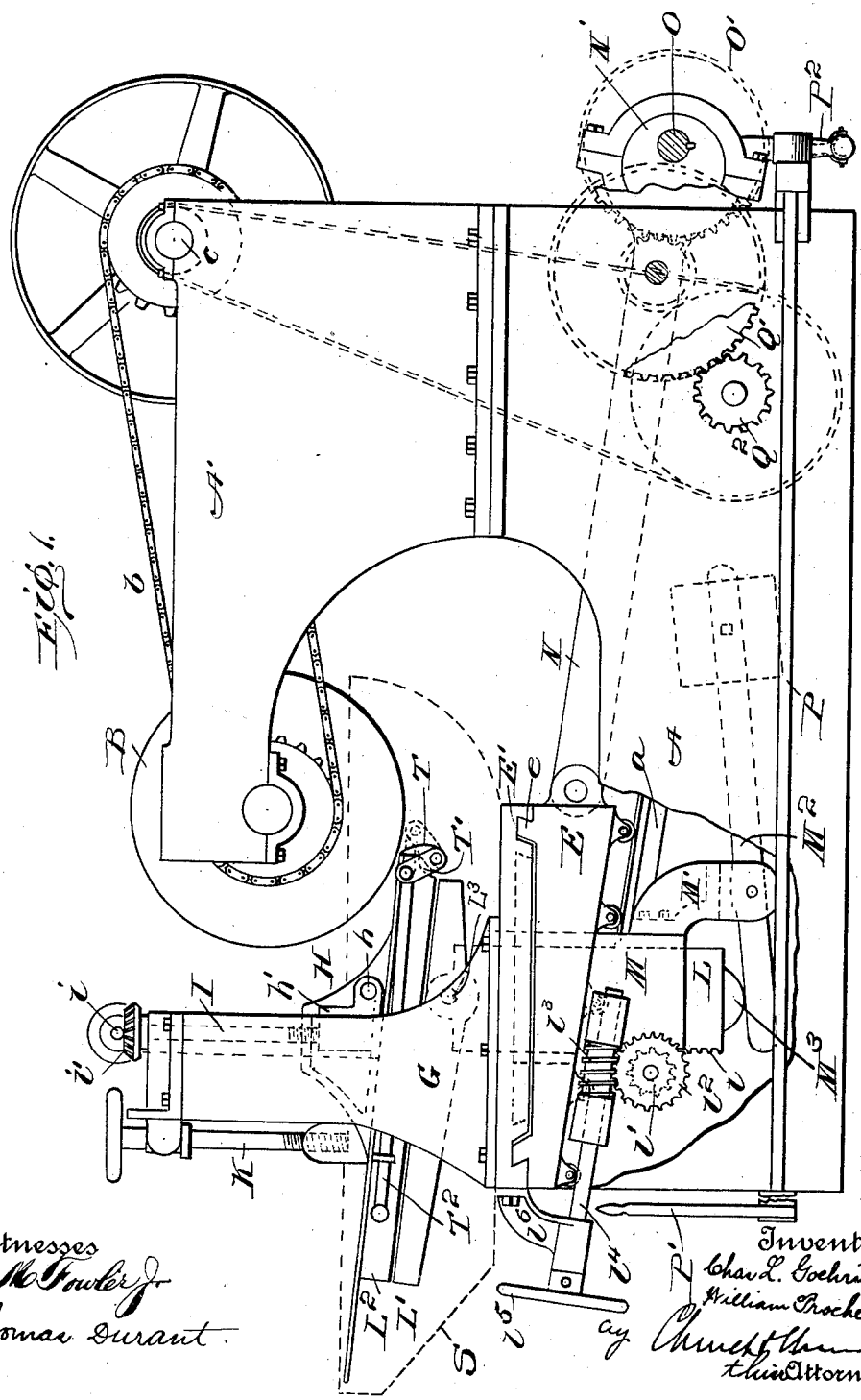

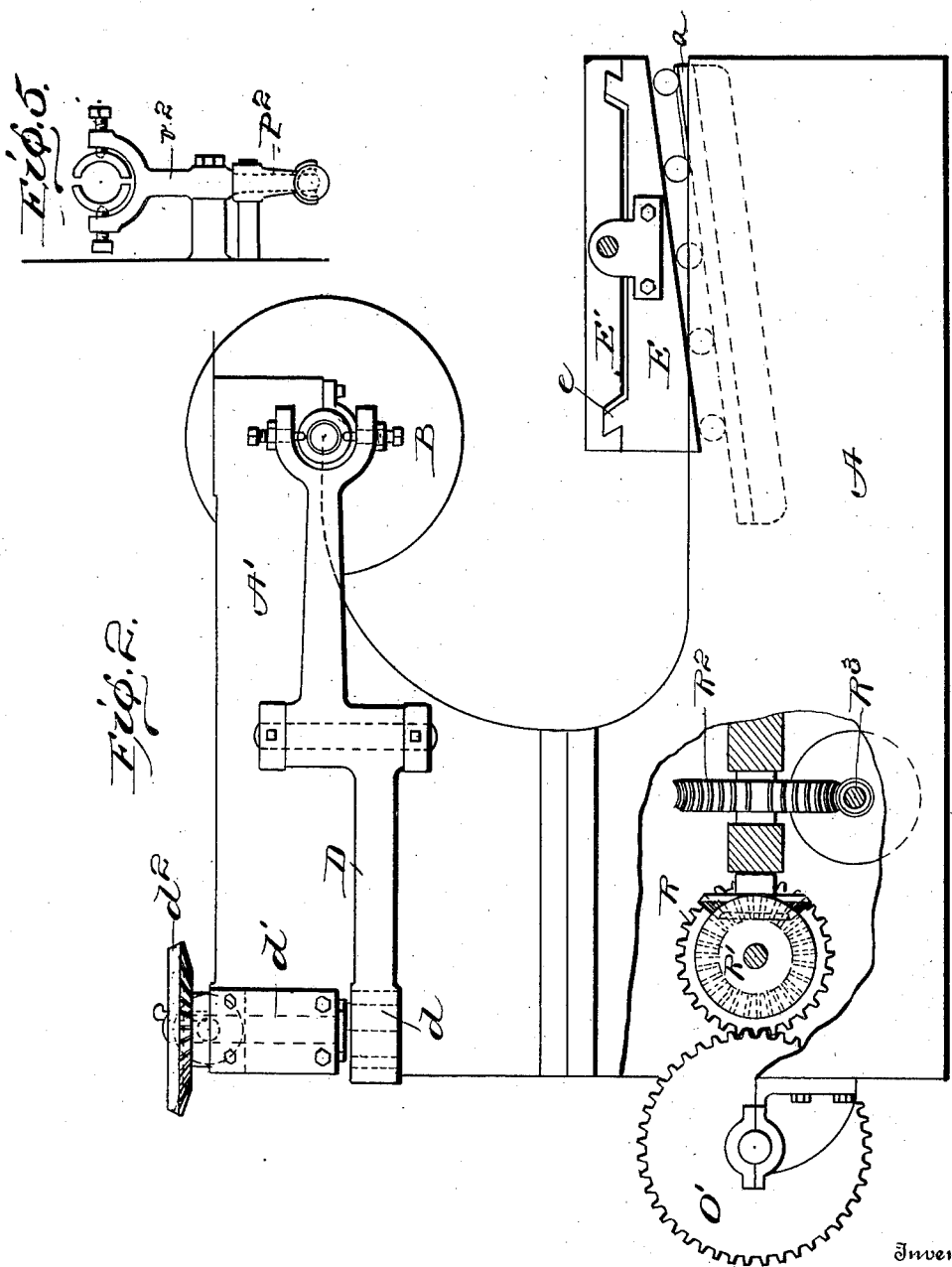

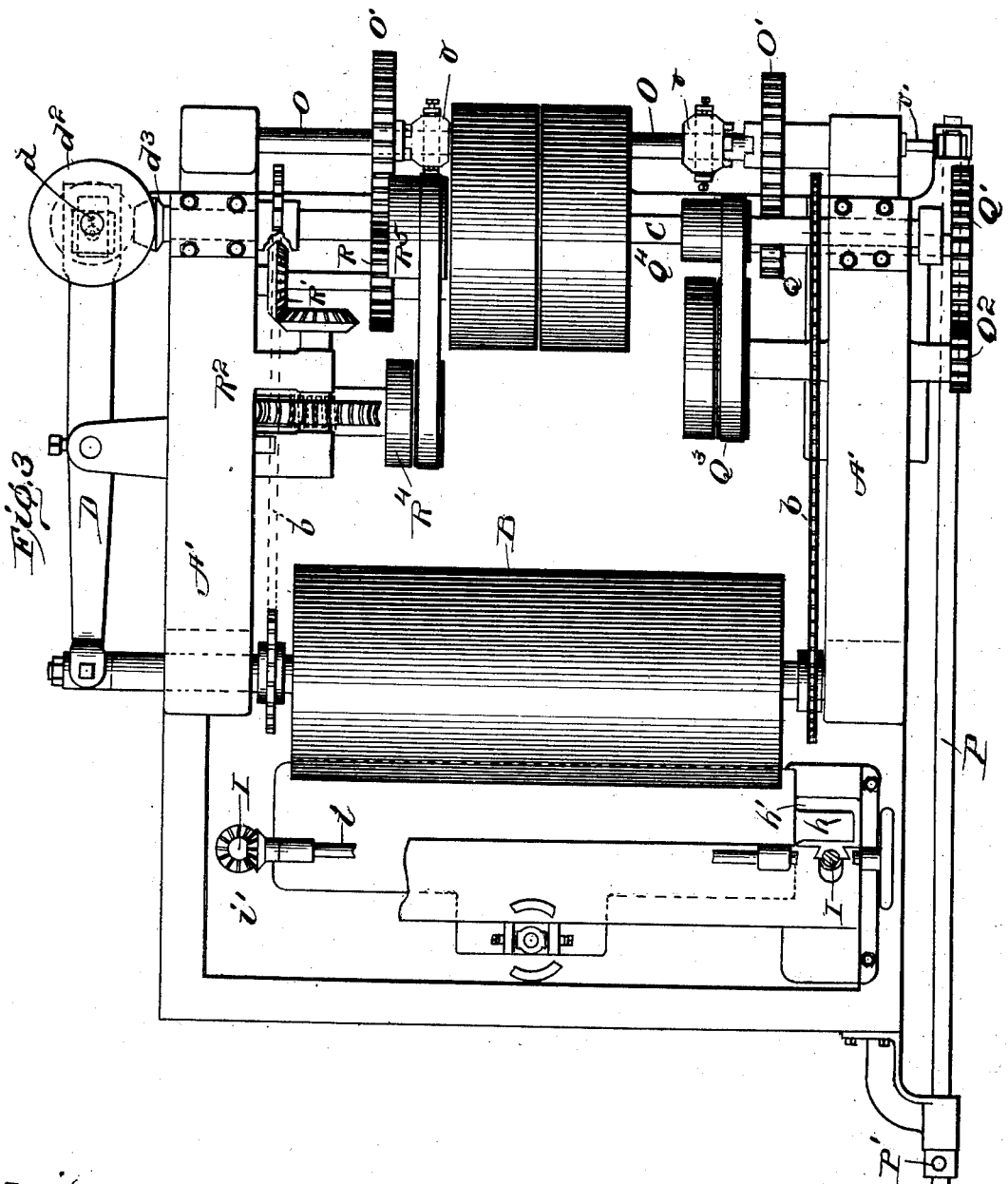

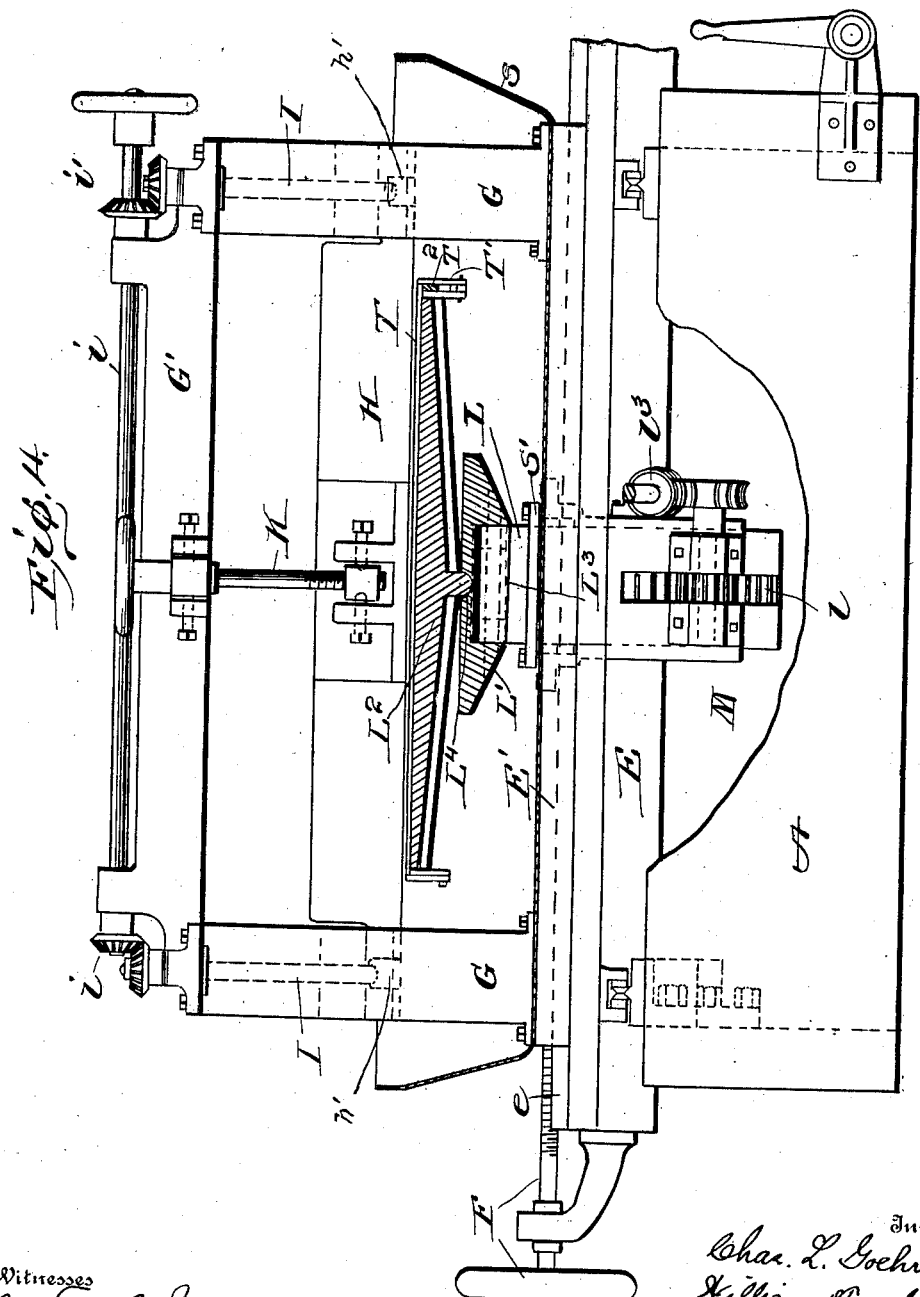

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 737,392, dated August 25, 1903.

Application filed May 28, 1903. Serial No. 159,201. (No model.)

*To all whom it may concern:*

Be it known that we, CHARLES L. GOEHRING and WILLIAM TROCHE, residing at Akron, county of Summit, and State of Ohio, have invented certain new and useful Improvements in Glass-Grinding Machines; and we do hereby declare the following to be a full, clear, and exact description of the same, reference being had to the accompanying drawings, forming a part of this specification, and to the letters of reference marked thereon.

This invention relates to improvements in grinding-machines, and more especially, though not exclusively, to machines for beveling the edges of plates of glass by grinding, the objects of the invention being to improve and simplify the mechanism, whereby the grinding may be effected accurately with relation to the face of the plate without the necessity for separate adjustment to receive each plate operated on, particularly where the plates are of irregular thickness.

The invention consists in means whereby the grinder and the bed against which the glass is clamped and by which its position is determined may be located on the same side of the glass plate, the grinder and face of the plate being thus brought into a definite relation regardless of irregularities in the thickness of the plate.

The invention further consists in certain novel details of construction and combinations and arrangements of the parts, all as will be hereinafter described, and pointed out particularly in the appended claims.

Referring to the accompanying drawings, Figure 1 is a side elevation of a glass-beveling machine embodying the present improvements with portions broken away to disclose underlying parts. Fig. 2 is a similar view looking at the opposite side of the machine with the work-holder and connected parts removed. Fig. 3 is a top plan view of the frame, grinder, its driving mechanism, and a portion of the work-holding mechanism. Fig. 4 is a front elevation with portions broken away and portions in section. Fig. 5 is a detail of a part of the clutch-operating mechanism.

Like letters of reference in the several figures denote the same parts.

The main frame of the machine is indicated by the letter A, and the overhanging arms or superstructure in which the grinder B is journaled is indicated by A'. The grinder in the machine illustrated is cylindrical and is rotated from a drive-shaft C by chains $b$. In addition to its rotation the grinder preferably receives a bodily movement longitudinally of its axis, such movement being imparted by a lever D, Figs. 2 and 3, one end of which engages a collar on the grinder-shaft and the other end of which is slotted to coöperate with a crank-pin $d$ on a vertical shaft $d'$, rotated by a bevel-gear $d^2$ and a pinion $d^3$ on the main drive-shaft C.

The work holding and supporting mechanism is carried by the forward portion of the main frame and is preferably all mounted, so as to travel in the plane of the surface being ground—*i. e.*, in the machine illustrated in the plane of the bevel—for which purpose the said mechanism is mounted to travel on ways or tracks $a$, preferably located at each side of the main frame. To afford a firm foundation, there is provided a primary table E, preferably mounted on rollers running on the aforesaid tracks or ways, suitable transverse ways $e$ being formed on the upper surface of said table to receive a secondary table E', adapted to be adjusted transversely by a hand-wheel and screw F, Fig. 4.

A supplemental frame consisting of standards G and cross-piece G' is rigidly mounted on the secondary table, and a bed H is mounted to work vertically in the standards, the vertical adjustment being effected by screws I, connected by a cross-shaft $i$ and bevel-gears $i'$, whereby the bed may be adjusted manually to any desired height. The bed is preferably mounted to swing in bearings $h$ on blocks $h'$, through which the screws I pass, whereby the inclination of the bed with relation to the grinder may be varied, the adjustment being effected and the bed held by an adjusting-screw K, preferably mounted in gimbal-bearings on the cross-piece G' and bed, respectively. The under face of the bed is its operative face, in that the glass to be ground is clamped up against and its position determined by the same, as will be now explained.

Passing through the secondary carriage is a vertically-movable standard L, preferably of relatively large diameter and guided in a cylindrical or other suitably-shaped guide M, projecting downwardly through a relatively large opening in the primary carriage E. The standard is adapted to be adjusted vertically by a rack $l$, with which a gear-wheel $l'$ meshes, said wheel being journaled in bearings on the guide M and rotated by a worm-wheel $l^2$ and worm $l^3$ on a shaft $l^4$, extending out to the front of the machine and provided with a hand-wheel $l^5$. The outer end of the shaft may be supported in a bracket $l^6$, projecting from the front of the secondary table.

Upon the upper end of the standard L there is mounted a primary clamp L', preferably on an axis extending transversely of the machine or parallel with the axis of the grinder, and upon this primary clamp there is mounted a secondary clamp $L^2$, preferably on an axis extending at right angles to the axis of the primary clamp. The pivotal bearings for these clamps may be ordinary hinge-joints or one may be a hinge-joint, as at $L^3$, Figs. 1 and 4, and the other be formed by a groove and semicylindrical rib, as at $L^4$, Fig. 4, the object being to provide a structure which will be capable of tilting to a limited extent in any direction, so as to accommodate itself to the back or under face of the glass when the latter is clamped up against the bed H. To facilitate the vertical adjustment of the clamps and glass, a counterbalance is preferably employed, and as a convenient arrangement, which will not interfere with the movements of the parts, a weighted lever $M^2$, journaled in a bracket M' on the guide M, bears against the lower end of the standard L, the bearing-surface being preferably rounded, as at $M^3$.

The traverse of the glass and its supporting and adjusting mechanism is effected by a connecting-rod N, jointed to the primary carriage at its forward end and operated by an eccentric N' on a shaft O at the rear end of the machine.

In order to increase the speed of the machine, both by effecting a quick return and by permitting of a traverse being effected only coextensive with the width of the surface or bevel being ground, a reverse driving-gear is provided for the shaft O, the return movement being more rapid than the forward movement, said mechanism being preferably manually controlled by a single lever.

Two trains of gearing are provided between the shaft O and main drive-shaft, both embodying gears O', loose on the shaft O, but adapted to be clutched therewith by clutches $o$. Both clutches are controlled by a transverse shifting rod $o'$ and levers $O^2$, Fig. 5. A movement of the rod in one direction connects one gear with the shaft and a movement in the opposite direction connects the other gear with the shaft, while if the rod be left in an intermediate position both clutches will be disengaged and the shaft left at rest.

The shifting rod may be conveniently operated from the front of the machine by a rockshaft P, having a handle P' at the forward end and a crank-arm $P^2$ at the rear end, to which latter the shifting-rod is jointed. One of said trains of gearing consists of the gears Q Q' $Q^2$ and belt wheels or pulleys $Q^3$ and $Q^4$, the latter on the main drive-shaft C. The other train of gearing consists of a gear-wheel R, bevel-gears R', worm-wheel $R^2$, worm $R^3$, and belt wheels or pulleys $R^4$ and $R^5$, the latter on the main drive-shaft C. The pulleys $Q^3$ and $R^4$ may be fast and loose pulleys and the pulleys $Q^4$ and $R^5$ wide pulleys, whereby either belt may be shifted to the loose pulley and the other train of gearing employed, exclusively. This may be desirable with some classes of work or when it is desired that the shaft O make a complete revolution in effecting complete reciprocations of the work.

The structure described is convenient for effecting the grinding beneath the surface of a body of water, as the pan S may be mounted on the secondary table, in which case the pan and water are not adjusted vertically with the glass and clamps; but the standard on which the latter are mounted works through a stuffing-box S', whereby the weight to be lifted in adjusting the glass is very materially reduced.

To facilitate the positioning of the glass on the clamp, a movable stop or stops is or are provided along one edge of the upper clamp, against which the glass may be placed parallel with the grinder, such stop or stops being then moved out of the way of the grinder. In the preferred construction the stop is in the form of a water-bar T, hinged along one edge to the edge of the clamp and adapted when turned up to the position indicated in Fig. 1 to project above the surface of the clamp parallel with the axis of the grinder. By making the stop in the form of a bar not only is a true edge provided to position the glass but the water set in motion by the rotation of the grinder is prevented from floating the glass while it is being positioned on the clamp. The stop or water-bar may be conveniently operated by a crank-arm T' and rod $T^2$, extending forwardly into convenient position to be reached by the attendant.

In operation the bed is adjusted to the proper angle and height to give the desired width and angle to the bevel. The glass plate is then placed in position on the clamp with its edge against the stop, and the clamp, with the glass, is raised until the face of the glass is pressed firmly against the under surface of the bed, it being understood that the usual rubber pads are interposed between the glass and metal to prevent breakage. When the glass has been clamped in place, the stop is turned down out of the way and the clutch-lever P' moved in the proper direction to clutch the forward drive-gear with the shaft O. Rotation of shaft O draws the glass and its supports down the tracks or ways, causing the edge of the glass to pass beneath the grinder, whereby it is removed to the predetermined depth, the grinder passing off at the upper edge of the bevel. As soon as the grinder passes off of the glass, which time is determined by the depth and width of the bevel, the attendant moves the clutch-lever in the opposite direction, throwing the return-gearing into operation. The operation is completed when the glass has reached its forward position, and the feed is then arrested and a new edge to be beveled placed in position. Should the glass be thick at one edge and thin at another, it is obvious that the clamps will accommodate themselves to such irregularities and at the same time the depth and width of the bevel will be uniform with respect to the face of the glass, a result which is difficult to attain where the alinement of the glass is effected by the clamping the same against a bed located on the side of the glass opposite to the side on which the grinder operates. In other words, with the present machine the bed against which the glass is positioned and the grinder are both located on the same side of the plane of the glass, and consequently the glass is positioned with reference to its front face, and no provision is necessary for conforming the bed to the irregularities in the thickness of the glass. The bed and grinder always occupy predetermined positions of relative adjustment, except as to the traverse of one with respect to the other, and consequently thick, thin, or irregular glass may be ground with uniform bevels without changing a single adjustment of the machine.

Having thus described our invention, what we claim as new, and desire to secure by Letters Patent, is—

1. In glass-grinding machinery, the combination with a rotary grinder and a bed against which the glass is positioned both located on the same side of the plane of the glass and having a traverse with respect to each other to effect the grinding operation, of means located on the opposite side of the plane of the glass for clamping the glass against the bed; substantially as described.

2. In glass-grinding machinery, the combination with a rotary grinder and a bed against which the glass is positioned both located on the same side of the plane of the glass and having a traverse with respect to each other to effect the grinding operation, of a clamp located on the opposite side of the plane of the glass, and a manually-controlled adjusting mechanism for the clamp; substantially as described.

3. In glass-grinding machinery, the combination with a grinder and a bed against which the glass is positioned both located on the same side of the plane of the glass, of a pivotal clamp located on the opposite side of the plane of the glass whereby it may conform to irregularities in the thickness of the glass and means for moving the clamp bodily toward and from the bed; substantially as described.

4. In a glass-grinding machine, the combination with a grinder and a pivotally-adjustable bed both located on the same side of the plane of the glass and having a traverse with respect to each other to effect the grinding operation and whereby the angle of the plane of the glass may be varied with respect to the plane of the traverse, of means located on the opposite side of the plane of the glass for clamping the glass against the bed; substantially as described.

5. In glass-grinding machinery, the combination with a cylindrical grinder mounted on a horizontal axis, a vertically-adjustable bed mounted on a horizontal axis and means for holding the bed in its adjusted position, said bed and grinder being located on the same side of the plane of the glass whereby the glass may be positioned by its face-surface, of an adjustable clamp located on the opposite side of the plane of the glass and having a pivotal movement whereby it may conform to the plane of the rear surface of the glass; substantially as described.

6. In a glass-grinding machine, the combination with a rotary grinder and an adjustable clamp for the glass located on opposite sides of the plane of the glass, of a bed located on the same side of the glass with the grinder and against which the glass is clamped; substantially as described.

7. In a glass-grinding machine, the combination with a rotary grinder located above and an adjustable clamp below the plane of the glass, of a bed against the under face of which the glass is clamped, located above the plane of the glass, and means for varying the inclination of the bed; substantially as described.

8. In a glass-grinding machine, the combination with a rotary grinder and an inclined track or way, of a carriage mounted on said track or way, a bed against the under face of which the glass is positioned, a vertically-movable clamp on the carriage below the bed for clamping the glass up against the bed and a driving mechanism for effecting a traverse of the carriage bed and clamp; substantially as described.

9. In a grinding-machine for glass, the combination with the grinder, the overhanging bed against the under surface of which the glass is positioned and means for setting said bed with relation to the grinder, of a clamp below the bed, a vertically-movable standard on which the clamp is mounted and means for effecting a traverse of the bed and grinder with respect to each other; substantially as described.

10. In a grinder for glass, the combination with the grinder, of the carriage, the overhanging bed against the under face of which the glass is positioned mounted on the carriage, mechanism for adjusting said bed vertically, mechanism for adjusting the inclination of the bed, a vertically-movable clamp mounted on the carriage beneath the bed and means for effecting a relative traverse of the grinder and carriage; substantially as described.

11. In a grinder for glass, the combination with the grinder and the overhanging bed against the under face of which the glass is positioned, of a vertically-movable standard, the clamp supported on said standard and free to tilt in any direction to conform to the rear face of the glass and means for effecting a relative traverse of the grinder and bed; substantially as described.

12. In a glass-grinding machine, the combination with the grinder and the carriage having a traverse with respect to each other in grinding, of a vertically-adjustable bed pivotally mounted on the carriage on an axis parallel with the axis of the grinder and a clamp pivoted on an axis at right angles to the axis of the bed and between which clamp and the bed the glass is held for presentation to the grinder whereby the face of the glass will be brought into parallelism with the axis of the grinder; substantially as described.

13. In a glass-grinding machine, the combination with the grinder and carriage having a traverse with respect to each other in grinding, of standards on the carriage, of boxes on the standards connected for simultaneous vertical adjustment, a bed pivotally mounted in the boxes on an axis parallel with the axis of the grinder, and a clamp below the bed also mounted on the carriage on a central axis at right angles to the axis of the bed, whereby the clamp may conform to irregularities in the thickness of the glass while the face of the glass is presented to the grinder in a plane parallel with the axis of the latter; substantially as described.

14. In a glass-grinding machine, the combination with the grinder, of the carriage mounted on ways to move toward and from the grinder, a water-pan mounted on said carriage, a bed and clamp located in the water-pan and vertically adjustable independent thereof and mechanism controlling such vertical adjustment located outside of the water-pan; substantially as described.

15. In a glass-grinding machine, the combination with the main frame, the grinder journaled therein, the ways on the main frame, of the carriage mounted on said ways to effect a traverse in grinding, and a bed and clamp having a bodily-vertical adjustment on but independently of the carriage, and means for reciprocating the carriage on the ways in grinding; substantially as described.

16. In a glass-grinding machine, the combination with the grinder and carriage mounted on ways with means for reciprocating said carriage in grinding, of a glass-holding mechanism mounted on the carriage and having a bodily-vertical movement independently of said carriage and a counterbalance for said glass-holding mechanism supported on the carriage; substantially as described.

17. In a glass-grinding machine, the combination with the grinder and carriage mounted on ways with means for reciprocating said carriage in grinding, of a secondary carriage mounted on ways on the first-mentioned carriage to move transversely, a downwardly-extending guide on the secondary carriage, a standard in said guide, a glass-support on the upper end of the standard and an adjusting mechanism mounted on the secondary carriage and coöperating with the lower end of the standard; substantially as described.

18. In glass-grinding machinery, the combination with the glass-holding mechanism, water-pan in which the glass is immersed at the grinding-point, and grinder also immersed at the grinding-point, of the water-bar for deflecting the currents of water set in motion by the grinder whereby entry of water beneath the glass is prevented; substantially as described.

19. In glass-grinding machinery, the combination with the glass-holding mechanism, in which the glass is immersed at the grinding-point and grinder also immersed at the grinding-point, of the water-bar on the glass-support forming a stop against which the glass is positioned and a deflector for preventing the flow of water beneath the glass as it is being adjusted; substantially as described.

20. In glass-beveling machinery, the combination with the glass support and grinder, of a stop movably mounted at the forward edge of the support and against which the glass is positioned, with means for moving said stop out of the path of the grinder during the grinding operation; substantially as described.

21. In glass-beveling machinery, the combination with the glass support and grinder, of a movable stop parallel with the axis of the grinder and against which the edge to be beveled is positioned, means for securing the glass in its adjusted position, and means whereby the stop may be moved out of the path of the grinder during the grinding operation; substantially as described.

CHARLES L. GOEHRING.
WILLIAM TROCHE.

Witnesses:
F. J. STEINERT,
THOMAS CLEMENGER.